(12) United States Patent
Li et al.

(10) Patent No.: US 11,669,001 B2
(45) Date of Patent: Jun. 6, 2023

(54) PROJECTION DISPLAY SYSTEM

(71) Applicant: APPOTRONICS CORPORATION LIMITED, Guangdong (CN)

(72) Inventors: Yi Li, Shenzhen (CN); Fei Hu, Shenzhen (CN); Zuqiang Guo, Shenzhen (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 836 days.

(21) Appl. No.: 16/472,272

(22) PCT Filed: Jun. 23, 2017

(86) PCT No.: PCT/CN2017/089849
§ 371 (c)(1),
(2) Date: Jul. 24, 2019

(87) PCT Pub. No.: WO2018/113226
PCT Pub. Date: Jun. 28, 2018

(65) Prior Publication Data
US 2022/0113612 A1    Apr. 14, 2022

(30) Foreign Application Priority Data
Dec. 21, 2016 (CN) .......................... 201611191088.5

(51) Int. Cl.
*G03B 21/20* (2006.01)
*G03B 21/00* (2006.01)
*H04N 9/31* (2006.01)

(52) U.S. Cl.
CPC ....... *G03B 21/2013* (2013.01); *G03B 21/005* (2013.01); *G03B 21/206* (2013.01); *G03B 21/2073* (2013.01); *H04N 9/3111* (2013.01)

(58) Field of Classification Search
CPC .............. G03B 21/2013; G03B 21/005; G03B 21/206; G03B 21/2073
(Continued)

(56) References Cited

U.S. PATENT DOCUMENTS 8,125,702 B2 * 2/2012 Ward ................... H04N 9/3126
  359/259
9,024,241 B2 * 5/2015 Wang ...................... F21V 9/30
  250/226
(Continued)

FOREIGN PATENT DOCUMENTS

| CN | 1637465 A | 7/2005 |
| CN | 1664888 A | 9/2005 |

(Continued)

OTHER PUBLICATIONS

International Search Report for PCT/CN2017/089849, dated Sep. 13, 2017.
(Continued)

*Primary Examiner* — Jerry L Brooks

(57) ABSTRACT

A projection display system, including light emitting device, light splitting device, first, second and third light modulators. The light emitting device emits first light and second light in time sequence. The light splitting device splits the first and second light into first and second wavelength range light along first and second optical paths, respectively, and guides part of the second light along the first optical path. The first and second light modulators modulate the light along the first and second optical paths, respectively; the light modulated by the first and second light modulators is combined to obtain third light along third optical path. The third light modulator is in optical path between the light emitting device and the light splitting device and modulates the first and second light from the light emitting device; or
(Continued)

the third light modulator is in the third optical path and modulates the third light.

16 Claims, 6 Drawing Sheets

(58) Field of Classification Search
USPC .......................................................... 353/99
See application file for complete search history.

(56) References Cited

U.S. PATENT DOCUMENTS

| | | |
|---|---|---|
| 2001/0021004 A1 | 9/2001 | Yano |
| 2002/0057419 A1 | 5/2002 | Fujimori et al. |
| 2002/0126479 A1* | 9/2002 | Zhai .................... G02B 5/32 345/32 |
| 2003/0016335 A1 | 1/2003 | Penn |
| 2005/0162615 A1 | 7/2005 | Penn |
| 2005/0271312 A1* | 12/2005 | Uchiyama ........... H04N 9/3126 348/E9.027 |
| 2007/0024811 A1 | 2/2007 | Piehl et al. |
| 2011/0109818 A1 | 5/2011 | Uneda et al. |
| 2014/0347634 A1* | 11/2014 | Bommerbach ........ G03B 33/08 353/121 |
| 2016/0282707 A1 | 9/2016 | Tatsumi |

FOREIGN PATENT DOCUMENTS

| | | |
|---|---|---|
| CN | 101063520 A | 10/2007 |
| CN | 100374905 C | 3/2008 |
| CN | 103713455 A | 4/2014 |
| CN | 106200229 A | 12/2016 |
| CN | 206321932 U | 7/2017 |
| EP | 1427221 A2 | 6/2004 |
| WO | WO-2015149700 A1 | 10/2015 |
| WO | WO-2018073893 A1 * | 4/2018 ........... G03B 21/008 |

OTHER PUBLICATIONS

European Search Report issued to application No. 17883593.0, European Patent Office, dated Aug. 3, 2020.
First Office Action issued to Application No. 202010960983.9, The State Intellectual Property Office of People's Repbulic of China, dated May 25, 2021.

* cited by examiner

PROJECTION DISPLAY SYSTEM

CROSS-REFERENCE TO RELATED APPLICATION

This is the United States national phase of International Patent Application No. PCT/CN2017/089849 filed Jan. 23, 2017, which claims priority to CN 201611191088.5 filed Dec. 21, 2016, the entire contents of each of which hereby incorporated by reference.

TECHNICAL FIELD

The present disclosure relates to the field of projection display, and in particular, to a projection display system.

BACKGROUND

In the related art, the projection device uses a single LCD (Liquid Crystal Display) system for image processing or uses a 3LCD system for image processing.

DISCLOSURE OF THE INVENTION

Technical Problems

When a single LCD system is used for image processing, a red light, a green light and a blue light are processed by the LCD in turn so as to obtain three images of red, green and blue, and a colorful image that needs to be displayed is synthesized at a human eye according to vision persistence. Under this technical solution, the display quality of the image is very low, and for example, problems such as flicker and low brightness may occur.

When using a 3LCD system for image processing, each LCD only processes a light of one color at one time, and then lights are combined and emitted so as to obtain a colorful image, which is equivalent to the case where three LCDs are connected in parallel. Although this technical solution solves problems of image flicker and low brightness, contrast of the image is almost the same as that of the single LCD system, so that this technical solution consumes a high cost without bringing a desired display effect, and is not suitable for use in high-end market.

As shown in FIG. 1, a structural schematic diagram of an optical path of a projection display system in the related art is shown. A white light W is split into a yellow light Y and a blue light B by a wavelength light-splitting device, and the yellow light Y is further split into a red light R and a green light G. The blue light B, the green light G and the red light R are respectively incident on LCD1, LCD2 and LCD3 so as to form, after being modulated by the LCD, image lights of three colors that are respectively blue, green and red. Then, the image lights are combined by a light combining device (e.g., an X-Cube) to form an image on a screen through a projection lens. In this technical solution, there is always one light of one color that has a longer optical length (such as the red light R in the figure) than the other two lights, passes through more lenses and thus has large light loss and poor image quality. In addition, in this technical solution, the light combining device (e.g., an X-Cube) is jointed by four triangular prisms, and a surface of each triangular prism contacting other triangular prisms needs to be coated, but coating is difficult. Moreover, there is a gap between respective splicing prisms, which further results in light loss. In summary, due to the influence of various factors above, the display effect of the 3LCD projection display system is poor.

Therefore, a projection display system having higher display effect needs to be developed urgently.

SUMMARY

In view of the defect of low contrast of the projection display system in the related art, the present disclosure provides a projection display system capable of providing higher contrast, including:

a light emitting device configured to emit, in a time sequence, first light and second light, the first light and the second light having different colors; a light splitting device configured to split the first light into first wavelength range light emitted along a first optical path and second wavelength range light emitted along a second optical path, and to guide at least part of the second light to be emitted along the first optical path; a first light modulator located in the first optical path and configured to modulate light emitted along the first optical path, a second light modulator located in the second optical path and configured to modulate light emitted along the second optical path, wherein the light emitted after being modulated by the first light modulator and the light emitted after being modulated by the second light modulator are combined to obtain third light emitted along a third optical path; and a third light modulator located in an optical path between the light emitting device and the light splitting device and configured to modulate the first light and the second light that are emitted by the light emitting device; or a third light modulator located in the third optical path and configured to modulate the third light.

In one embodiment, the first light is yellow light, the second light is blue light, and the first wavelength range light is red light or green light.

In one embodiment, the light splitting device is further configured to split the second light into third wavelength range light emitted along the first optical path and fourth wavelength range light emitted along the second optical path.

In one embodiment, the first light is yellow light, the second light is cyan light, the first wavelength range light is red light, the second wavelength range light is green light, the third wavelength range light is blue light, and the fourth wavelength range light is green light; or the first light is yellow light, the second light is magenta light, the first wavelength range light is red light, the second wavelength range light is green light, the third wavelength range light is red light, and the fourth wavelength range light is blue light.

In one embodiment, the light splitting device is further configured to split the second light into two beams of light that are respectively emitted along the first optical path and the second optical path, the two beams of light having a same color.

In one embodiment, the light splitting device includes a color selection polarizer and a polarization light-splitter, the color selection polarizer is configured to convert the first light into combined light of the first wavelength range light in a first polarization state and the second wavelength range light in a second polarization state, and the polarization light-splitter is configured to split the combined light into the first wavelength range light emitted along the first optical path and the second wavelength range light emitted along the second optical path.

In one embodiment, the system further includes a control device configured to control ON and OFF of the light emitting device, in such a manner that the light emitting device is in an OFF state when the light modulator is in a rising edge or a falling edge.

In one embodiment, an optical length of the first optical path is equal to an optical length of the second optical path.

In one embodiment, each of the first light modulator and the second light modulator is one of a transmissive liquid crystal light valve, a reflective liquid crystal light valve and a digital micromirror device, and the third light modulator is one of a transmissive liquid crystal light valve, a reflective liquid crystal light valve and a digital micromirror device.

In one embodiment, the first light modulator and the second light modulator are digital micromirror devices, and the first light modulator and the second light modulator are located in an optical path of light emitted by the third light modulator; or the third light modulator is a digital micromirror device, and the third light modulator is located in an optical path of light emitted by the first light modulator and the second light modulator Beneficial Effect of the Present Disclosure Beneficial Effect Compared with the related art, the present disclosure splits, through the light splitting device, time sequence lights of the first light and the second light of different colors that are emitted by the light emitting device into lights emitted along the first optical path and the second optical path. By modulating the light along the first optical path by the first light modulator, modulating the light along the second optical path by the second light modulator, and then combining lights emitted from the first light modulator and the second light modulator into a third light, and further providing a third light modulator on an optical path between the light emitting device and the light splitting device, the light emitted by the light emitting device is modulated, or a third light modulator is provided on the third optical path for modulating the third light. Therefore, the following advantageous effects are achieved: in the case where only three light modulators are used, not only the light of each color is modulated by two light modulators so as to increase the contrast range of the projection display system, but also the optical lengths of the lights of respective colors are equal, thereby improving imaging effect, reducing light loss, and simplifying the optical path for combining light and thus lowering the design complexity.

DESCRIPTION OF EMBODIMENTS

Figure 1:
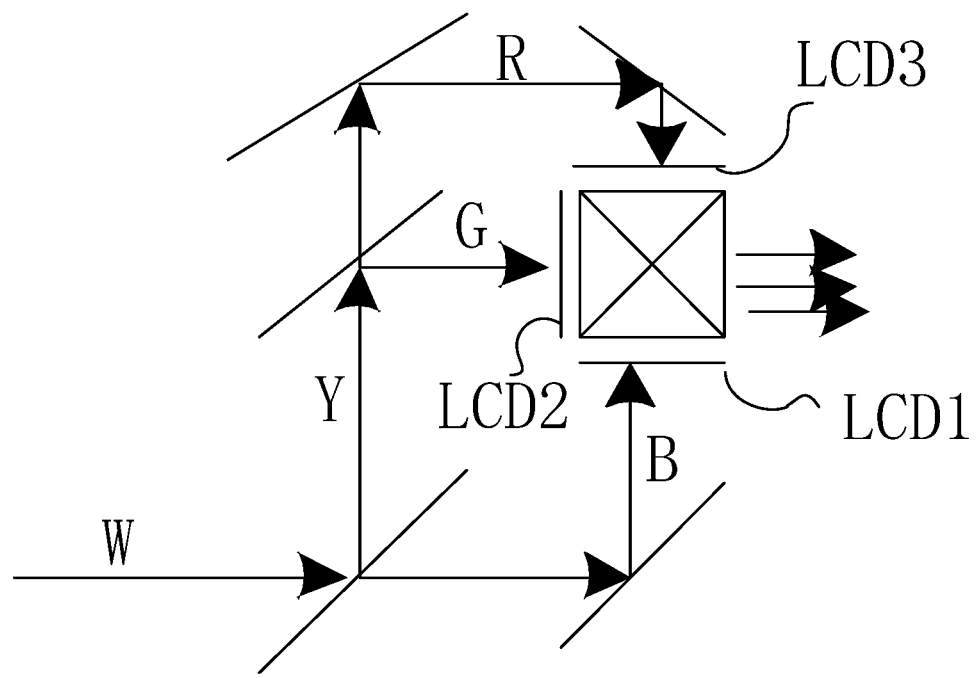
FIG. 1 is a structural schematic diagram of an optical path of a projection display system in the related art.

In view of the problems in the projection display system in the related art, such as low contrast, excessive loss of a light of one color and the like caused by "parallel connection" of three light modulators, the present disclosure changes the relationship of the three light modulators. The main inventive idea of the present disclosure is to "parallel connect" two light modulators and then "series connect" this pair of "parallel connected" light modulators with another light modulator. Through this technical solution, the display effect of the projection display system is improved without increasing the cost, so that this solution is an economical and practical technical solution.

The so-called "parallel connection of light modulators" means that one light is split into two lights, and then the two lights are combined after being respectively modulated by two light modulators; the so-called "series connection of light modulators" means that one light passes through two light modulators successively.

In the projection display system of the present disclosure, a light of any color is modulated by at least two light modulators and then emitted therefrom. If an adjustable gray range of the former light modulator is 0~N1 and an adjustable gray range of the latter light modulator is 0~N2, these two are "connected in series", such that the light passes through the former light modulator first and then passes through the latter light modulator. In this way, the adjustable gray range of the whole system becomes 0~N1×N2, thereby increasing the dynamic range of the projection display system, reducing the minimum brightness unit, and significantly improving the display effect and the contrast of the projection display system.

Moreover, the present disclosure only "parallel connects" two light modulators, such that problems in the related art, such as excessive light loss of a certain light and poor imaging quality caused by inconsistency of the optical lengths of the three light modulators that are in "parallel connection", are avoided; problems of complicated design of the light combining device and additional light loss occurring in the case where three paths of light are combined are also avoided.

In the present disclosure, "upstream of the optical path" means a position relatively close to the light source in a direction of an optical path, and "downstream of the optical path" means a position relatively close to the emergent end in the direction of the optical path.

Embodiments of the present disclosure are described in detail below with reference to the accompanying drawings.

In the present disclosure, for the sake of convenience, the descriptions related to "first", "second", "third" and the like are only used for descriptive purposes, but it is not to be understood as indicating or implying relative importance or implicitly pointing out the number of technical features indicated. Thus, features defined by "first", "second", and "third" may include at least one of the features, either explicitly or implicitly.

Figure 2:
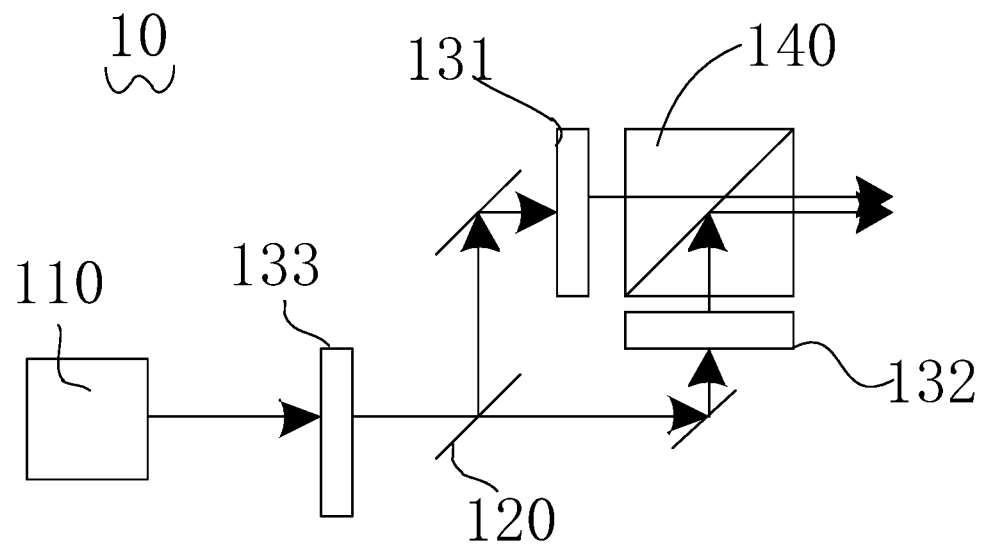
FIG. 2 is a structural schematic diagram of a projection display system according to an embodiment of the present disclosure.

Referring to FIG. 2, FIG. 2 is a structural schematic diagram of a projection display system according to an embodiment of the present disclosure. The projection display system 10 includes a light emitting device 110, a light splitting device 120, a first light modulator 131, a second light modulator 132, a third light modulator 133, and a light combining device 140.

In the present embodiment, a first light and a second light that are emitted by the light emitting device 110 are incident on the third light modulator 133, and the first light and the second light are incident on the light splitting device 120 after being modulated by the third light modulator 133. The light splitting device 120 splits the first light according to the wavelength range and splits it into a first wavelength range light emitted along a first optical path and a second wavelength range light emitted along a second optical path. Moreover, the light splitting device 120 also guides at least part of the second light to be emitted along the first optical path. The first light modulator 131 is located in the first optical path, and the first wavelength range light and at least part of the second light are incident on the first light modulator 131 along the first optical path and modulated by the first light modulator 131; the second light modulator 132 is located in the second optical path, and the second wavelength range light is incident on the second light modulator 132 along the second optical path and modulated by the second light modulator 132. The light emitted after being modulated by the first light modulator 131 and the light emitted after being modulated by the second light modulator 132 are combined at the light combining device 140, such that a third light emitted along a third optical path is obtained. The third light is projected onto a screen via a device such as a projection lens or the like to form a display image. Each device will be described one by one below.

<Light Emitting Device>

Figure 3:
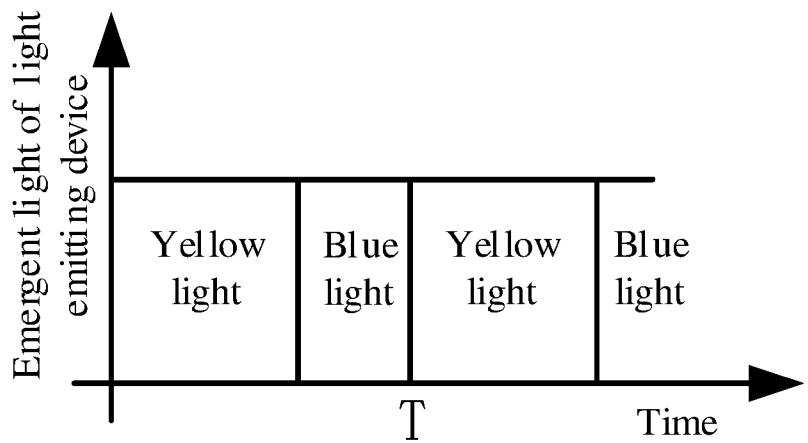
FIG. 3 is a time sequence diagram of an emitted light of a light emitting device in the embodiment of FIG. 2.
Figure 4:
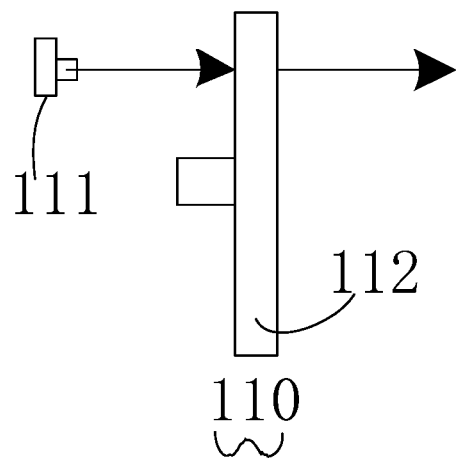
FIG. 4 is a structural schematic diagram of the light emitting device in the embodiment of FIG. 2.

The light emitting device 110 is used to emit a first light and a second light of different colors in a time sequence. In this embodiment, as shown in FIG. 3, the light emitting device 110 periodically emits the first light of a yellow light and the second light of a blue light in a time sequence. The structural schematic diagram of the light emitting device 110 is as shown in FIG. 4 and the light emitting device 110 includes a light emitting unit 111 and a wavelength conversion device 112. The light emitting unit 111 emits an excitation light, and the excitation light is incident on the wavelength conversion device 112. The wavelength conversion device 112 is driven to move by the driving device, so as to expose its different regions to the irradiation of the excitation light at different time, thereby generating, in a time sequence, a first light of a yellow light and a second light of a blue light.

The light emitting unit 111 is a laser light source, specifically a laser diode array light source, and is composed of multiple laser diodes arranged in an array. This light source has the advantages of a small divergence angle, high electro-optic conversion efficiency, good monochromaticity and the like, so that it is suitable for applications such as high-brightness display. In other embodiments of the present disclosure, the light emitting unit may also be a single laser diode, or a solid-state laser light source, or an LED light source or an LED array light source, without affecting the implementation of the technical solution of the subsequent optical path system.

Figure 5:
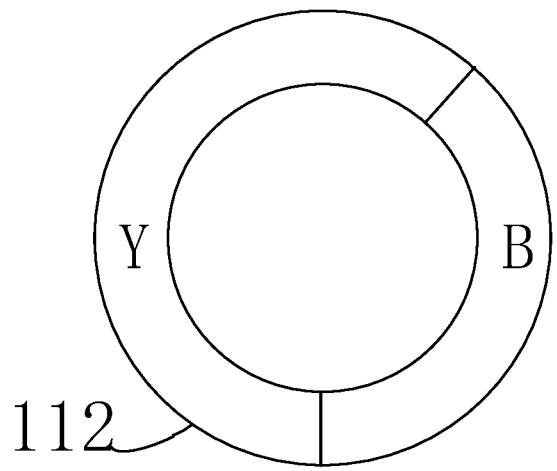
FIG. 5 is a structural schematic diagram of a wavelength conversion device of the light emitting device shown in FIG. 4.

The structural schematic diagram of the wavelength conversion device 112 is as shown in FIG. 5. The wavelength conversion device 112 includes two regions: a yellow light region Y and a blue light region B that are used for receiving the light emitted by the light emitting unit 111 and are respectively emitting a first light of a yellow light and a second light of a blue light. In this embodiment, the light emitted by the light emitting unit 111 is a blue light, and correspondingly, the yellow light region Y is a yellow fluorescent region, includes a yellow fluorescent material (such as but not limited to YAG: Ce phosphor), and can absorb a blue light and convert it into a yellow light having a broad spectrum (the spectral range covers the red color segment and the green color segment); the blue light region B is a transmissive region, and the blue light emitted by the light emitting unit 111 is transmitted through the blue light region B to form the second light of the blue light. In one embodiment of the present disclosure, the blue light region B contains scattering material for changing the light distribution of the incident blue light so as to make it more uniform and performing decoherence to the blue light (if the blue light is laser).

It can be understood that in another embodiment of the present disclosure, the light emitted by the light emitting unit may also be light of other spectra, such as but not limited to ultraviolet light; both of the two regions of the wavelength conversion device may also be wavelength conversion regions that perform wavelength conversion on the incident light; in addition, the two regions of the wavelength conversion device may also be regions for emitting lights of other colors.

In the present embodiment, the wavelength conversion device 112 is a color wheel that rotates about its center axis under the driving of the driver device (such as a motor). In another embodiment of the present disclosure, the wavelength conversion device may also be a color barrel/color cylinder including multiple regions distributed around the barrel/cylinder surface, and the color barrel/color cylinder rotates about its axis direction, so that the multiple regions are sequentially and periodically irradiated by the excitation light source; alternatively, the wavelength conversion device may also be a color plate including multiple regions arranged in sequence in a straight line direction, and the color plate linearly vibrates in the straight line direction, such that the multiple regions are sequentially and periodically irradiated by the excitation light source.

The light emitting device 110 in this embodiment is a light emitting device in which the light emitting unit 111 is combined with the wavelength conversion device 112. Emitting the first light and the second light in a time sequence by taking advantages of the motion of the wavelength conversion device 112 is only one specific implementable embodiment, and its advantage lies in that once angles occupied by respective regions of the wavelength conversion device 112 and the motion period of the wavelength conversion device 112 are set, the time sequence of the first light and the second light can be controlled without complicated electronic control. It can be understood that since the function of the light emitting device of the present disclosure is to generate the first light and the second light in a time sequence, the light emitting device, in other embodiments, can be any other device capable of implementing this function. For example, the light emitting device may be a device including multiple light emitting sources that emit lights of different colors, and the multiple light emitting sources are turned on and off under the control of the control device to emit the first light and the second light in a time sequence.

In another embodiment of the present disclosure, the light emitting device may be further additionally provided with a supplementary light source based on the light emitting device shown in FIG. 4. For example, a light emitting unit and a supplementary light source are included, wherein the light emitted by the light emitting unit generates time sequence lights having different colors through a wavelength conversion device, and the light emitted by the supplementary light source and the time sequence light emitted by the wavelength conversion device are combined to obtain the first light and the second light that have different colors which are emitted in a time sequence. Here, the light emitted by the supplementary light source and the light emitted by the light emitting unit can be combined before entering the wavelength conversion device and then are incident on the wavelength conversion device together; it is also possible to combine the light emitted by the supplementary light source with the light emitted by the wavelength conversion device after the light conversion device emits the light. In a specific example, the light emitting unit emits a blue light and the wavelength conversion device includes a yellow light emission region and a blue light emission region. Further, the supplementary light source is a red light. Therefore, the light emitted by the light emitting device is a first light of a yellow light (or an orange light) and a second light of a magenta light that are in a time sequence, and this technical solution can improve the display effect of the red light of the projection display system.

<Light Splitting Device>

In this embodiment, the light splitting device 120 is a dichroic sheet, which reflects the first wavelength range light and the second light, and transmits the second wavelength range light. It can be understood that in another embodiment of the present disclosure, the dichroic sheet that transmits the first wavelength range light and the second light and reflects the second wavelength range light may also be disposed by transposing optical paths. The dichroic sheet may be a device in which multiple layers of dielectric films are plated on a transparent substrate, or the like.

In a direction of the light emitted by the light splitting device 120, i.e., on the first optical path and the second optical path, a reflective mirror may be provided as shown for guiding the optical path, and an optical element such as a lens (not shown) may be further additionally provided.

<Light Modulator>

In this embodiment, during one frame of image, the third light modulator 133 respectively modulates, according to the relevant data of the image, the first light and the second light that are emitted by the light emitting device 110. Specifically, a processor processes the data related to the color of the first light in the image to generate a first light modulation signal and sends it to the third light modulator. The processor processes the data related to the color of the second light in the image to generate a second light modulation signal and sends it to the third light modulator. The third light modulator respectively modulates the first light and the second light according to the input modulation signals. In this process, the third light modulator 133 converts the uniformly distributed light incident on an incident face thereof into a light having a non-uniform spatial distribution on the emergent face of the third light modulator 133 (in the case of an image being a non-pure color image). Since the colors of the first light and the second light that are emitted by the light emitting device are different, the first light and the second light that are emitted in a time sequence are modulated, via the modulation of the third light modulator 133, into a first monochromatic image and a second monochromatic image that are sequentially emitted in a time sequence. The uniform light on the incident face of the light modulator is referred to as an "illumination light", and the light having a non-uniform spatial distribution on the emergent face of the light modulator is referred to as an "image light" (meaning a light having a pattern). In an embodiment of the present disclosure, in order to obtain an uniform illumination light, other optical devices such as a light-homogenizing device, a beam reduction/amplifier device and the like, for example a scattering sheet, a lens group, a reflective mirror group and so on, which are not described herein again, may be further included between the light emitting device 110 and the third light modulator 133.

Then, the light emitted from the third light modulator 133 is split by the light splitting device 120 into two lights that are imaged to incident faces of the first light modulator 131 and the second light modulator 132, respectively. Specifically, a first light of a yellow light emitted by the third light modulator 133 is split by the light splitting device 120 to form a red light having a first wavelength range and a green light having a second wavelength range. The first monochromatic image (the yellow image) on the emergent face of the third light modulator 133 can be regarded as a superposition of two images—a red image and a green image, then they are imaged from the emergent face of the third light modulator 133 to the incident face of the first light modulator 131 and the incident face of the second light modulator 132, respectively. The second monochromatic image (the blue image) formed on the emergent face by the second light of the blue light emitted from the third light modulator 133 is imaged, along the first optical path through the light splitting device 120, to the incident face of the first light modulator 131.

When the first wavelength range light and the second light are incident on the first light modulator 131, the first light modulator 131 respectively modulates the first wavelength range light and the second light according to the relevant data in the same image; when the second wavelength range light is incident on the second light modulator 132, the second light modulator 132 modulates the second wavelength range light according to the relevant data in the same image. The same image herein means that the modulation command, according to which the first light modulator, the second light modulator and the third light modulator modulate the incident light during one frame of image, is based on the same image data source. This image data source includes at least image data of respective color components of red, green and blue. For example, the first light modulator 131 modulates the first wavelength range light according to the image data of the red component in the image data source, and the second light modulator 132 modulates the second wavelength range light according to the image data of the green component in the same image data source, and the third light modulator 133 modulates the first light according to the image data of the red and green components in the image data source.

Specifically, in one embodiment, regarding each pixel, the third light modulator 133 modulates according to the color having a larger gray value in the red color and the green color of the pixel in the image data source. If a pixel has only a single red color or green color, the third light modulator 133 cooperates with the first light modulator 132 or the second spatial light modulator 132 to synchronously modulate directly according to the gray value of the red color or the green color of the pixel, such that the brightness finally displayed by the pixel coincides with the gray value of the data of this frame of image. If a pixel has a mixture color of a red color and a green color, the third light modulator 133 modulates according to the color that has a larger gray value in the red color and the green color and cooperates with the first light modulator 132 or the second spatial light modulator 132 to synchronously modulate, such that the brightness of the color having a larger gray value of the pixel coincides with the gray value of this color of the data of this frame of image; moreover, for the color having a smaller gray value, by obtaining a ratio of the gray value of the red color to the gray value of the green color, the light passing rate of the first light modulator or the second light modulator corresponding to this color is correspondingly adjusted (for example, appropriately reducing the light passing rate), such that this color can finally display a gray value coinciding with the data of this frame of image.

In this embodiment, the first light modulator 131, the second light modulator 132, and the third light modulator 133 are all transmissive liquid crystal light LCD valves, and the light transmittance of each pixel is controlled by adjusting the arrangement direction of the liquid crystals in the LCD. In this embodiment, the light emitting device 110 is required to provide polarized light in order to be modulated by the LCD.

Figure 6:
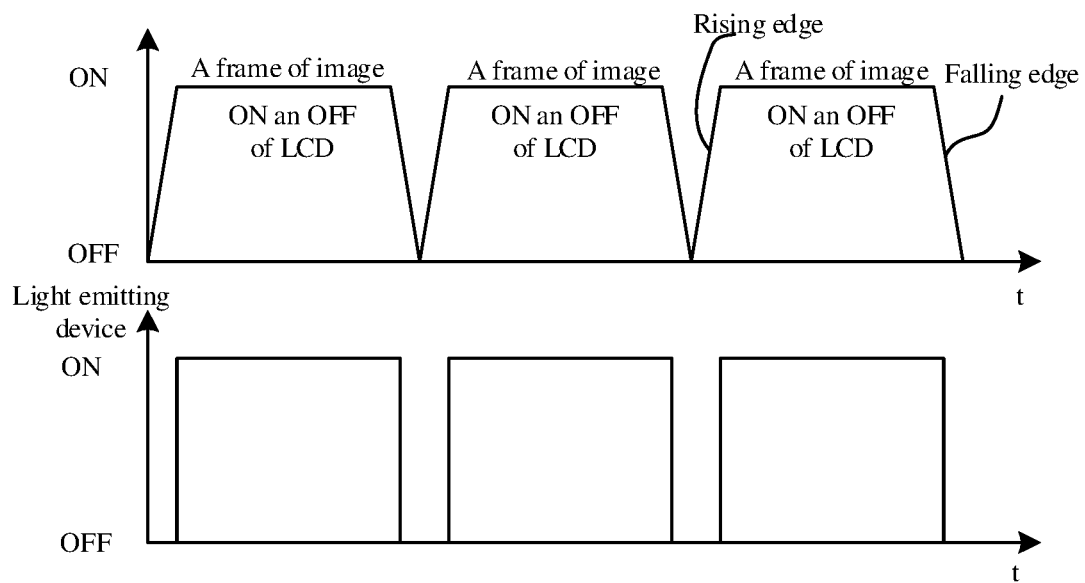
FIG. 6 is a time sequence relationship diagram between ON and OFF of a light modulator and ON and OFF of the light emitting device.

Referring to FIG. 6, since both the ON and OFF of the LCD have a rising edge and a falling edge during the modulation process for each frame of image, the light modulator does not modulate the light in the rising edge or the falling edge, which causes waste of the light and may result in reduced contrast of the projection display system. In one embodiment of the present disclosure, the projection display system further includes a control device for controlling the ON and OFF of the light emitting device. The light emitting device is turned on after the LCD is fully turned on, and the light emitting device is turned off when the LCD starts to be turned off, so that the light emitting device is in an OFF state during the rising edge and the falling edge of the LCD, which saves energy and avoids contrast reduction. Other types of light modulators such as DMD (Digital Micromirror Device) also have rising and falling edges, and the ON and OFF of the light emitting device can be controlled by the control device, such that when the light modulator is in the rising edge or the falling edge, the light emitting device is in an OFF state.

<Light Combining Device>

Image lights emitted by modulation of the first light modulator 131 and the second light modulator 132 are incident on the light combining device 140 and overlap to form one colorful image light of a third light which is projected onto a screen via the subsequent optical path to achieve image display. In this embodiment, the light combining device 140 is formed by splicing two right-angle prisms, and by plating a wavelength selection film on the adjacent faces of the two right-angle prisms, the light from the first light modulator 131 is transmitted and the light from the second light modulator 132 is reflected. The structure is greatly simplified compared to the technical solution in which three light modulators are "parallel connected" (namely, a light combining device spliced by four triangular prisms is adopted), which reduces the joining face and the joint seam, reduces the coating area, and simplifies the structure. Further, there is an air gap between adjacent faces of the two right-angle prisms of the light combining device 140 to facilitate the implementation of the function of the wavelength selection film.

In another embodiment of the present disclosure, the light combining device includes a polarization light-splitter that can split light and combine light depending on the polarization state of the incident light. By setting the polarization states of the lights emitted by the first light modulator and the second light modulator to be different (for example, one is a S light and one is a P light), combining of the image lights emitted by the two can be achieved.

In the present embodiment, the illumination light from the light emitting device 110 passes through a third light modulator 133 and then is split into two lights that respectively enter the first light modulator 131 and the second light modulator 132. These two lights are then combined into one beam. In this process, as in the above embodiment, the optical lengths of the lights of any color are equal (regardless of the optical length difference problem caused by the fact that lights having different wavelengths have different light speeds in the medium). Namely, the imaging processes of lights of any color are substantially the same, and problems caused by additionally providing a relay imaging device due to a light having a certain color do not matter. Moreover, a light of any color respectively passes through two light modulators, such as the third light modulator 133 and the first light modulator 131, or the third light modulator 133 and the second light modulator 132, so that the contrast range of the displayed image is greatly increased and thus the projection display system can achieve HDR (High-Dynamic Range) display. Therefore, the image display effect is greatly improved without increasing the cost. Further, since in the present disclosure, the image light of an emergent face of the light modulator located at the upstream of the optical path (such as the third light modulator 133 in the present embodiment) is imaged to an incidence face of the light modulator located at the downstream of the optical path (such as the first light modulator 131 and the second light modulator 132 in the present embodiment). Therefore, only when the optical lengths of the respective color lights are equal, a pixel modulation unit of the light modulator located at the downstream of the optical path can be accurately matched with the image light incident on its incident face so as to ensure the imaging quality. Specifically, an optical length of the first optical path is equal to that of the second optical path. Namely, the optical lengths of the respective color lights from the emission position of the light splitting device to the light-recombining position are equal (the optical path after the combination is the third optical path).

In another embodiment of the present disclosure, the first light is a yellow light and the second light is a blue light. The first wavelength range light is a green light. The second wavelength range light is a red light. In this technical solution, the first light modulator modulates the green light and the blue light, while the second light modulator modulates the red light. Since the thermal effect of the red light is stronger than that of the blue light and the green light, the light modulator that modulates the red light generates more heat, which easily affects the service life of this light modulator. The arrangement of the present embodiment allows the blue light and the green light that generate less heat to be modulated by one light modulator, while the red light generating more heat is modulated by another light modulator, such that heat is shared, thereby lengthening the service life of the projection display system. In addition, since the second light modulator for modulating the red light is in an idle state when the first light modulator modulates the blue light, heat of the second light modulator can be better dissipated.

In the above embodiment, the light splitting device splits only the first light and does not split the second light, so that the second light modulator has an idle time. In the following embodiments of the present disclosure, the light splitting device splits the second light, and the second light is split into a third wavelength range light emitted along the first optical path and a fourth wavelength range light emitted along the second optical path.

In an embodiment of the present disclosure, the first light is a yellow light and the second light is a cyan light. The first wavelength range light is a red light. The second wavelength range light is a green light. The second light of the cyan light is split by the light splitting device into a third wavelength range light of a blue light in a first optical path direction and a fourth wavelength range light of a green light in a second optical path direction. In this technical solution, the first light modulator modulates the red light and the blue light, and the second light modulator modulates the green light. This technical solution greatly increases the green light component. Since the green light contributes the most to the brightness of the white light of the projection display system, the output brightness of the projection display system is greatly increased.

In one embodiment of the present disclosure, the first light is a yellow light and the second light is magenta light. The first wavelength range light is a red light and the second wavelength range light is a green light. The second magenta light is split by the light splitting device into a third wavelength range light of a red light in a first optical path direction and a fourth wavelength range light of a blue light in a second optical path direction. In this technical solution, the first light modulator modulates the red light and the second light modulator modulates the green light and the blue light. This technical solution increases the red light component, which overcomes the defect in the related art that the display effect of the red color of the projection display system is poor (especially because the red light component in the yellow fluorescence is small and the red phosphor has low luminous efficiency).

In one embodiment of the present disclosure, the light splitting device is used to split the second light into two lights having the same color that are respectively emitted along the first optical path and the second optical path, so that the modulation time of the second light is shortened to improve the luminous flux output per unit time of the projection display system, thereby improving the output light intensity of the projection display system. In a specific embodiment, the first light is a yellow light and the second light is a blue light. The first wavelength range light is a red light and the second wavelength range light is a green light. The second light of the blue light is split by the light splitting device into a first blue light along the first optical path and a second blue light along the second optical path (it can be split into lights having different polarization states by using polarization states, or it can be split into two lights having the same wavelength property by using the reflection and refraction effect of the medium of the light splitting device). In this technical solution, both the first light modulator and the second light modulator modulate the blue light, so that the modulation time of the blue light is shortened, thereby improving the luminous flux output per unit time of the projection display system and improving the light intensity of the projection display system.

Figure 7:
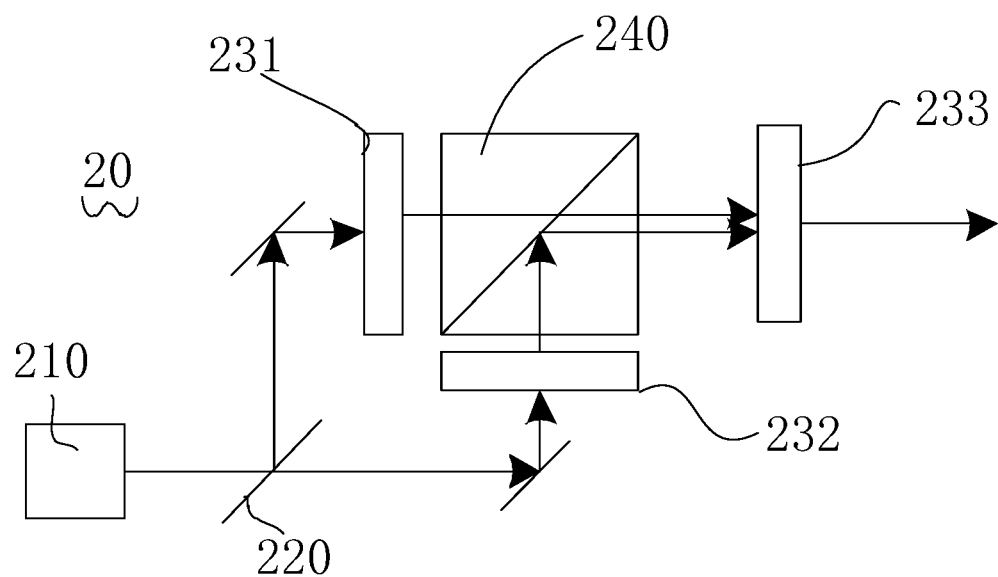
FIG. 7 is a structural schematic diagram of a projection display system according to another embodiment of the present disclosure.

Referring to FIG. 7. FIG. 7 is a structural schematic diagram of a projection display system according to another embodiment of the present disclosure. The projection display system 20 includes a light emitting device 210, a light splitting device 220, a first light modulator 231, a second light modulator 232, a third light modulator 233, and a light combining device 240.

In this embodiment, a first light and a second light that have different colors and are emitted by the light emitting device 210 in a time sequence are incident on the light splitting device 220. The light splitting device 220 splits the first light according to the wavelength range and splits it into a first wavelength range light emitted along a first optical path and a second wavelength range light emitted along a second optical path. Moreover, the light splitting device 220 also guides at least part of the second light to be emitted along the first optical path. The first light modulator 231 is located in the first optical path. The first wavelength range light and at least part of the second light are incident on the first light modulator 231 along the first optical path and modulated by the first light modulator 231; the second light modulator 232 is located in the second optical path, and the second wavelength range light is incident on the second light modulator 232 along the second optical path and modulated by the second light modulator 232. The light emitted after being modulated by the first light modulator 231 and the light emitted after being modulated by the second light modulator 232 are combined at the light combining device 240, so that a third light emitted along the third optical path is obtained. The third light modulator 133 is located in the third optical path and modulates the third light emitted by the light combining device 240. Thereafter, the third light is projected onto a screen via a device such as a projection lens or the like to form a display image.

In this embodiment, the illumination light from the light emitting device 210 is split into two lights that respectively enter the first light modulator 231 and the second light modulator 232, and then these two lights are combined into one beam which will pass through the third light modulator 233. In this process, as in the above embodiment, the optical lengths of the lights of any color are equal (regardless of the optical length difference problem caused by the fact that lights having different wavelengths have different light speeds in the medium). Namely, the imaging processes of lights of any color are substantially the same, and problems caused by additionally providing a relay imaging device due to a light having a certain color do not matter. Moreover, the light of any color respectively passes through two light modulators, such as a first light modulator 231 and a third light modulator 233, or the second light modulator 232 and the third light modulator 233, so that the contrast range of the displayed image is greatly increased and thus the projection display system can achieve HDR display. Therefore, the image display effect is greatly improved without increasing the cost. Further, since in the present disclosure, the image light of an emergent face of the light modulator located at the upstream of the optical path (such as the first light modulator 231 and the second light modulator 232 in the present embodiment) is imaged to an incidence face of the light modulator located at the downstream of the optical path (such as the third light modulator 233 in the present embodiment). Therefore, only when the optical lengths of the respective color lights are equal, a pixel modulation unit of the light modulator located at the downstream of the optical path can be accurately matched with the image light incident on its incident face so as to ensure the imaging quality.

Compared to the embodiment shown in FIG. 2 above, the difference in this case lies in that the third light modulator 233 is located in an optical path behind the first light modulator 231 and the second light modulator 232 instead of the optical path in front of them. In this technical solution, the light emitted by the light emitting device is split into two paths that are then incident on two different light modulators, and after modulation, an image light with weakened intensity is obtained. The image light is then incident on the third light modulator for modulation, so that the heat generation of the three light modulators is more uniform, which slows down the aging of the light modulator due to thermal effects, thereby lengthening the service life of the light modulator. In contrast, in the technical solution of the embodiment in FIG. 2, the light emitted by the light emitting device is directly and completely incident on the third light modulator firstly, such that the generated heat amount of the third light modulator is much larger than that of the first light modulator and the second light modulator, which may cause the third light modulator to age faster.

In this embodiment, regarding to properties, such as structure, function and the like, of the light emitting device, the light splitting device, the light combining device and the light modulator and the color selection of various lights (such as the first light, the second light, the first wavelength range light, the second wavelength range light . . . ), reference can be made to the description in the above embodiments.

Figure 8:
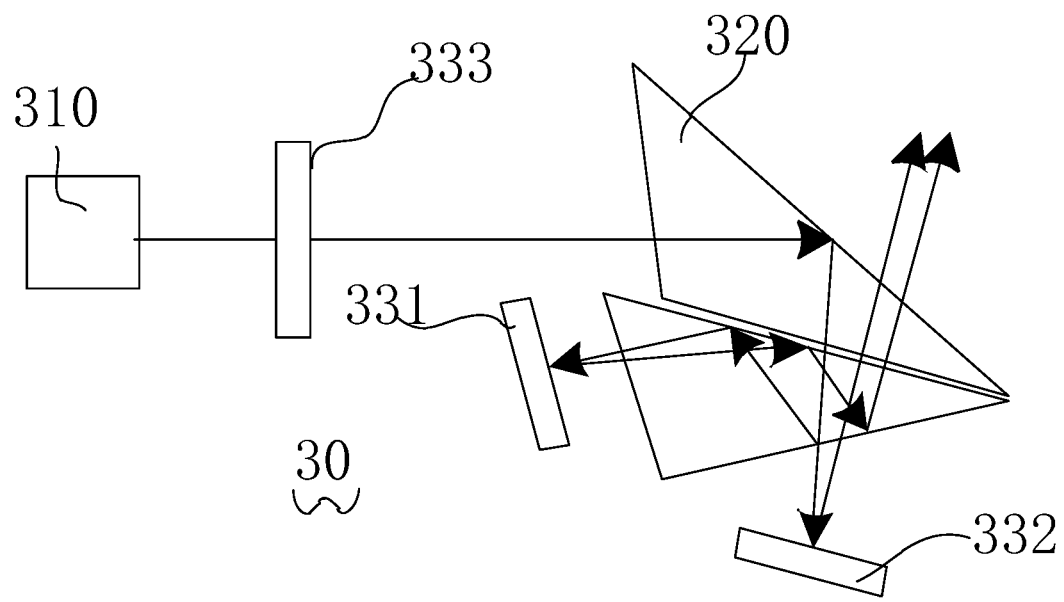
FIG. 8 is a structural schematic diagram of a projection display system according to an embodiment of the present disclosure.

Referring to FIG. 8. FIG. 8 is a structural schematic diagram of a projection display system according to another embodiment of the present disclosure. The projection display system 30 includes a light emitting device 310, a light splitting device 320, a first light modulator 331, a second light modulator 332, and a third light modulator 333.

In the present embodiment, a first light and a second light that are emitted by the light emitting device 310 are incident on the third light modulator 333. After being modulated by the third light modulator 333, the first light and the second light are incident on the light splitting device 320. The light splitting device 320 splits the first light according to the wavelength range and splits it into a first wavelength range light emitted along a first optical path and a second wavelength range light emitted along a second optical path. Moreover, the light splitting device 320 also guides at least part of the second light to be emitted along the first optical path. The first light modulator 331 is located in the first optical path. The first wavelength range light and at least part of the second light are incident on the first light modulator 331 along the first optical path and modulated by the first light modulator 331; the second light modulator 332 is located in the second optical path, and the second wavelength range light is incident on the second light modulator 332 along the second optical path and modulated by the second light modulator 332. The light emitted after being modulated by the first light modulator 331 and the light emitted after being modulated by the second light modulator 332 are combined at the light splitting device 320, so that a third light emitted along a third optical path is obtained. The third light is projected onto a screen via a device such as a projection lens or the like to form a display image.

Compared with the embodiment shown in FIG. 2 above, the difference in this embodiment lies in that the first light modulator 331 and the second light modulator 332 are replaced by digital micromirror devices DMD. This light modulator adjusts the gray value of the corresponding pixel of the micromirror by controlling the time proportions of the ON state and the OFF state of each micromirror. In this embodiment, the light emitted by the light emitting device 310 is first modulated by an LCD light modulator and then split into two paths that are respectively modulated by two DMD light modulators. Compared with the case in which the LCD light modulator controls the lightness and darkness of an image by controlling the transmittance of the light, the DMD light modulator guides the light to the non-emission channel in the OFF state, and the dark portion of the obtained projected image is darker. Namely, a black image emitted by the DMD light modulator is "blacker" with respect to a black image emitted by the LCD light modulator. Therefore, the present embodiment uses the DMD light modulator as a light modulator at the downstream of the optical path, which is advantageous for obtaining a smaller minimum brightness, thereby increasing the contrast of the projection display system.

In this embodiment, the light splitting device 320 is a combination of two TIR (Total Internal Reflection) prisms, and simultaneously performs the functions of light splitting and light combining.

In this embodiment, regarding to properties, such as structure, function and the like, of the light emitting device, the light splitting device, the light combining device and the light modulator and the color selection of various lights (such as the first light, the second light, the first wavelength range light, the second wavelength range light . . . ), reference can be made to the description in the above embodiments.

Figure 9:
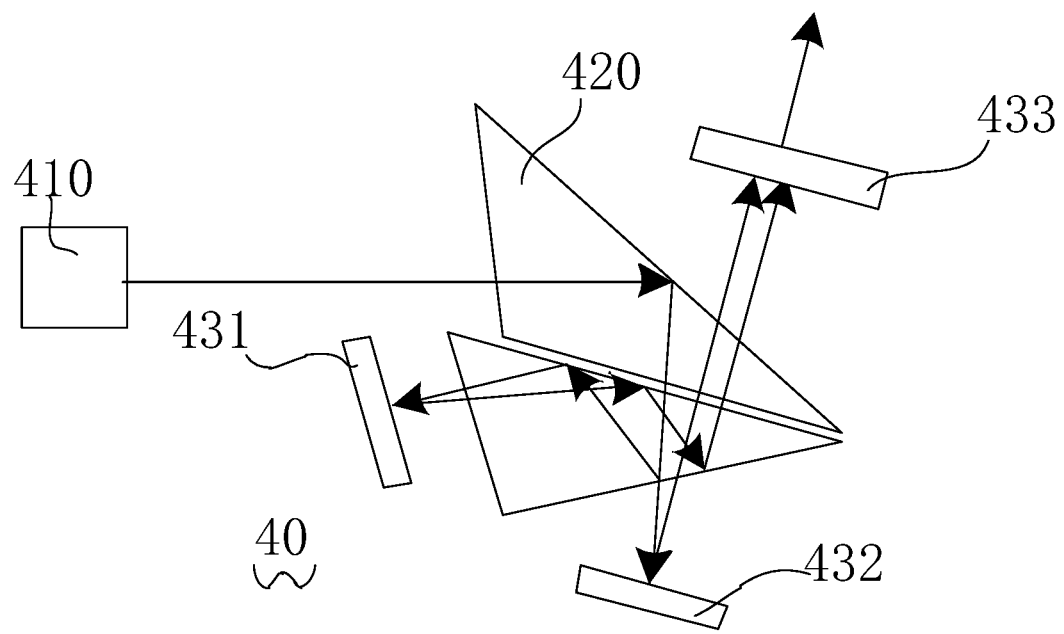
FIG. 9 is a structural schematic diagram of a projection display system according to an embodiment of the present disclosure.

Referring to FIG. 9. FIG. 9 is a structural schematic diagram of a projection display system according to another embodiment of the present disclosure. The projection display system 40 includes a light emitting device 410, a light splitting device 420, a first light modulator 431, a second light modulator 432, and a third light modulator 433.

Compared to the embodiment shown in FIG. 8, the difference in this embodiment lies in that the third light modulator 433 is located in an optical path behind the first light modulator 431 and the second light modulator 432 instead of the optical path in front of them. In this technical solution, the light emitted by the light emitting device is split into two paths that are then incident on two different light modulators, and after modulation, an image light with weakened intensity is obtained. The image light is then incident on the third light modulator for modulation, so that the heat generation of the three light modulators is more uniform, which slows down the aging of the light modulator due to thermal effects, thereby lengthening the service life of the light modulator.

In this embodiment, regarding to properties, such as structure, function and the like, of the light emitting device, the light splitting device, the light combining device and the light modulator and the color selection of various lights (such as the first light, the second light, the first wavelength range light, the second wavelength range light . . . ), reference can be made to the description in the above embodiments.

Figure 10:
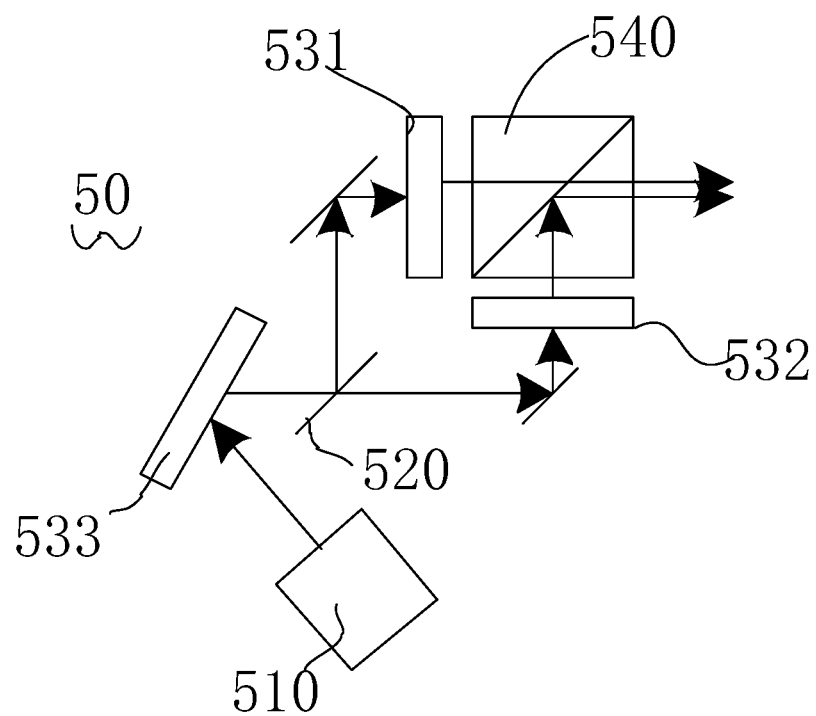
FIG. 10 is a structural schematic diagram of a projection display system according to an embodiment of the present disclosure.

Referring to FIG. 10. FIG. 10 is a structural schematic diagram of a projection display system according to another embodiment of the present disclosure. The projection display system 50 includes a light emitting device 510, a light splitting device 520, a first light modulator 531, a second light modulator 532, a third light modulator 533, and a light combining device 540.

Compared with the embodiment shown in FIG. 2, the difference in this embodiment is that the third light modulator 533 is a DMD light modulator.

Figure 11:
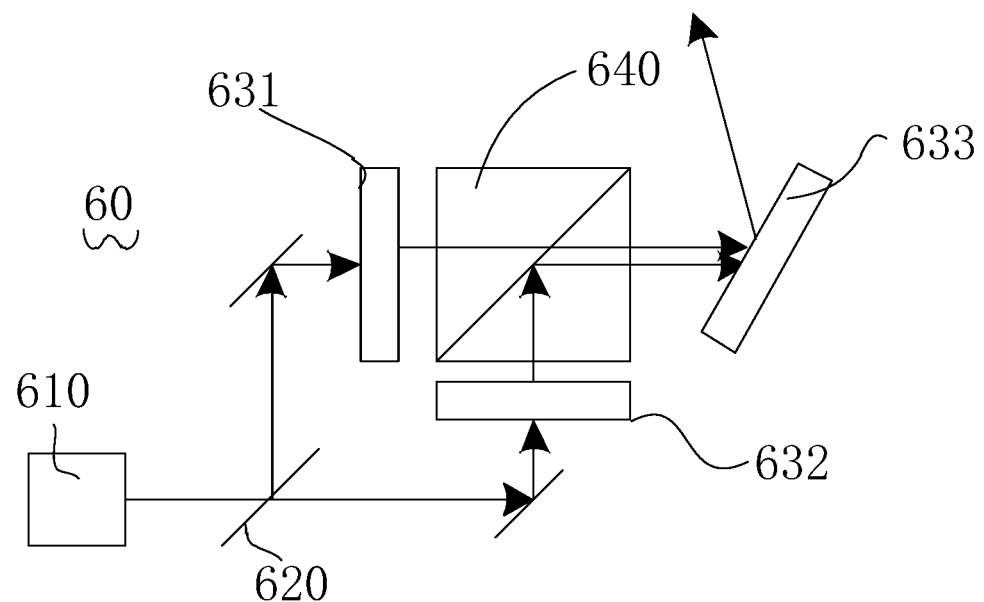
FIG. 11 is a structural schematic diagram of a projection display system according to an embodiment of the present disclosure.

Referring to FIG. 11. FIG. 11 is a structural schematic diagram of a projection display system according to another embodiment of the present disclosure. The projection display system 60 includes a light emitting device 610, a light splitting device 620, a first light modulator 631, a second light modulator 632, a third light modulator 633, and a light combining device 640.

Compared with the embodiment shown in FIG. 10, the difference in this embodiment is that the third light modulator 633 is located in an optical path behind the first light modulator 631 and the second light modulator 632 instead of the optical path in front of them. In this technical solution, the light emitted by the light emitting device is split into two paths that are then incident on two different light modulators, and after modulation, an image light with weakened intensity is obtained. The image light is then incident on the third light modulator for modulation, so that the heat generation of the three light modulators is more uniform, which slows down the aging of the light modulator due to thermal effects, thereby lengthening the service life of the light modulator.

Moreover, the third light modulator 633 of the DMD type is located downstream of the optical path, which is advantageous for obtaining a smaller minimum brightness, thereby increasing the contrast of the projection display system. Since the cost of the DMD is higher than that of the LCD, this technical solution uses only one DMD and combines it with two LCDs to improve brightness and contrast while taking into account the cost, which has practical application significance.

Figure 12:
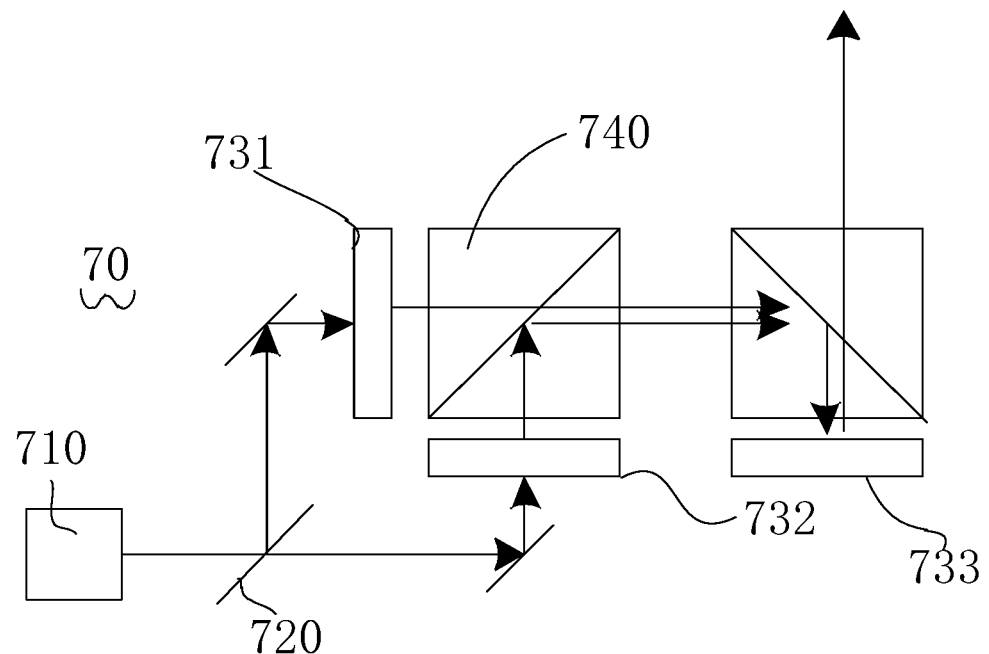
FIG. 12 is a structural schematic diagram of a projection display system according to an embodiment of the present disclosure.

Referring to FIG. 12, FIG. 12 is a structural schematic diagram of a projection display system according to another embodiment of the present disclosure. The projection display system 70 includes a light emitting device 710, a light splitting device 720, a first light modulator 731, a second light modulator 732, a third light modulator 733, and a light combining device 740. Compared with the embodiment shown in FIG. 7, the difference in this embodiment is only that the type of the third light modulator is replaced by a reflective liquid crystal light valve LCOS (Liquid Crystal On Silicon). The display contrast of LCOS is better than that of LCD, which makes the contrast of the projection display system higher. In addition, LCOS and LCD are both liquid crystal modulation devices, so that the compatibility is better. In this technical solution, similarly, the light emitted by the light emitting device is split into two paths that are then incident on two different light modulators, and after modulation, an image light with weakened intensity is obtained. The image light is then incident on the third light modulator for modulation, so that the heat generation of the three light modulators is more uniform, which slows down the aging of the light modulator due to thermal effects, thereby lengthening the service life of the light modulator.

Similarly, in any of the above embodiments, the third light modulator can be replaced with a reflective liquid crystal light valve LCOS, and adaptive change is made to change the optical path accordingly, which will not be described in detail herein again.

Figure 13:
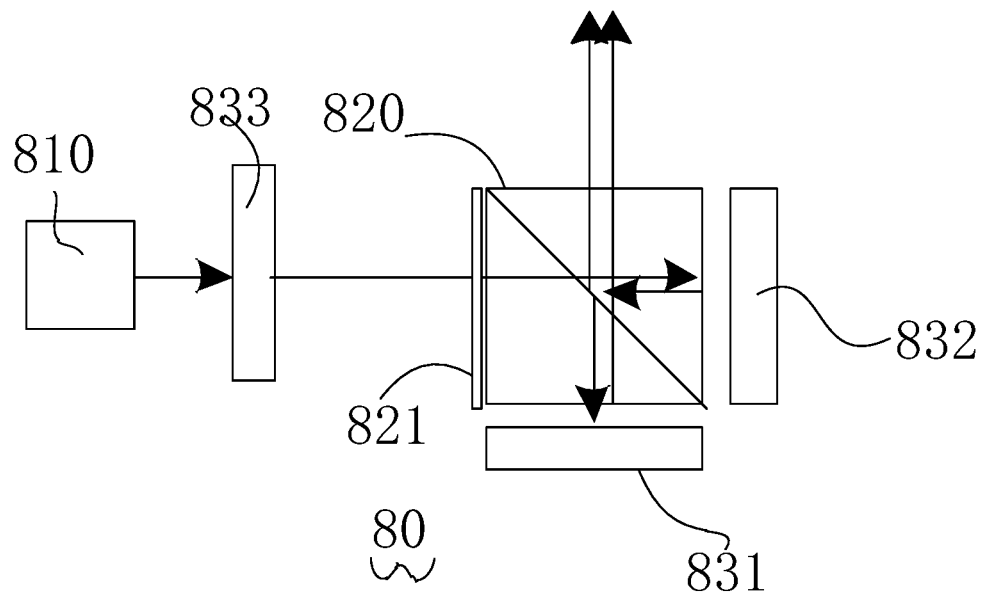
FIG. 13 is a structural schematic diagram of a projection display system according to an embodiment of the present disclosure.

Referring to FIG. 13, FIG. 13 is a structural schematic diagram of a projection display system according to another embodiment of the present disclosure. A projection display system 80 includes a light emitting device 810, a light splitting device 820, a first light modulator 831, a second light modulator 832, and a third light modulator 833.

Unlike the above embodiments, in this technical solution of the embodiment, the first light modulator 831 and the second light modulator 832 are both reflective liquid crystal light valves LCOS.

In this embodiment, the light splitting device 820 includes a color selection polarizer 821, and the light incident on the color selection polarizer 821 is linearly polarized light of a first polarization state. The color selection polarizer changes the polarization state of the second wavelength range light but does not change the polarization state of the first wavelength range light. When a first light of the linear polarization state passes through the color selection polarizer 821, it is converted into a combined light of a first wavelength range light of the first polarization state and a second wavelength range light of the second polarization state, and the first polarization state and the second polarization state are orthogonal polarization states. The light splitting device 820 further includes a polarization light-splitter for guiding the first wavelength range light of the first polarization state to be incident on the first light modulator 831 along a first optical path and guiding the second wavelength range light of the second polarization state to be incident on the second light modulator 832 along a second optical path. The polarization states of the first wavelength range light and the second wavelength range light are changed after being modulated by the first light modulator 831 and the second light modulator 832, respectively, so that they are combined at the polarization light-splitter of the light splitting device 820 to form a the third light to be emitted.

In this embodiment, the polarization states of the first wavelength range light and the second wavelength range light are first converted into two different polarization states by using a color selection polarizer, and then the polarization light-splitter is used for light splitting/light combining, which avoids the drift phenomenon of the filter curve caused by the large angle of the light incident on the wavelength light-splitter in the technical solution using the wavelength light-splitter to split/combine light, thereby lowering process requirements under the premise of achieving accurate light splitting of the first wavelength range light and the second wavelength range light.

In the other embodiments described above, light splitting can also be performed by combining the color selection polarizer and the polarization light-splitter, such that the light splitting of the first wavelength range light and the second wavelength range light is more precise.

In the embodiment of FIG. 13, the third light modulator 833 is a transmissive liquid crystal light valve LCD, and the image light emitted by the third light modulator 833 is a linearly polarized light of a single polarization state and can be directly used for the light splitting device 820 of the present embodiment. In other embodiments, the third light modulator may also be replaced by a reflective liquid crystal light valve LCOS or a digital micromirror device DMD, simply by changing the optical path accordingly.

In the present embodiment of FIG. 13, the third light modulator is disposed upstream of the optical path of the first light modulator and the second light modulator. In other embodiments, the third light modulator may also be disposed downstream of the optical path of the first light modulator and the second light modulator. However, it should be noted that when the third light modulator is a liquid crystal light valve, it is necessary to add a color selection polarizer on an incident side of the third light modulator, such that the light incident on the third light modulator is light of a single polarization state.

The projection display system of the present disclosure can be applied to projectors such as cinema projectors, engineering projectors, miniature projectors, educational projectors, wall projectors, laser televisions, etc., and can also be applied to image illumination such as image projection lamps, transportation (vehicles, ships and airplanes) lights, searchlights, stage lights and the like.

The various embodiments in the present specification are described in a progressive manner, and each embodiment focuses on differences from other embodiments, and the same and similar parts among the various embodiments may be referred to each other.

The above is only embodiments of the present disclosure and is not intended to limit the scope of the disclosure. All the equivalent structure or equivalent process transformation made according to the specification and the drawings of the present disclosure or those directly or indirectly applied to other related technical field are equally included in the patent scope of the present disclosure.

What is claimed is:

1. A projection display system, comprising:
   a light emitting device configured to emit, in a time sequence, first light and second light, the first light and the second light having different colors;
   a light splitting device configured to split the first light into first wavelength range light emitted along a first optical path and second wavelength range light emitted along a second optical path, and to guide at least part of the second light to be emitted along the first optical path;
   a first light modulator located in the first optical path and configured to modulate light emitted along the first optical path,
   a second light modulator located in the second optical path and configured to modulate light emitted along the second optical path, wherein the light emitted after being modulated by the first light modulator and the light emitted after being modulated by the second light modulator are combined to obtain third light emitted along a third optical path; and
   a third light modulator located in an optical path between the light emitting device and the light splitting device and configured to modulate the first light and the second light that are emitted by the light emitting device,
   wherein during one frame of image, the third light modulator modulates, according to image data of a first component in image data source, the first light to obtain a first monochromatic image light, and modulates according to image data of a second component in image data source, the second light to obtain a second monochromatic image light; and
   wherein the light splitting device is configured to split the first monochromatic image light into a first wavelength range image light and a second wavelength range image light that are emitted along the first optical path.

2. The projection display system according to claim 1, wherein the first light is yellow light, the second light is blue light, and the first wavelength range light is red light or green light.

3. The projection display system according to claim 1, wherein the light splitting device is further configured to split the second light into third wavelength range light emitted along the first optical path and fourth wavelength range light emitted along the second optical path.

4. The projection display system according to claim 3, wherein the first light is yellow light, the second light is cyan light, the first wavelength range light is red light, the second wavelength range light is green light, the third wavelength range light is blue light, and the fourth wavelength range light is green light; or
   the first light is yellow light, the second light is magenta light, the first wavelength range light is red light, the second wavelength range light is green light, the third wavelength range light is red light, and the fourth wavelength range light is blue light.

5. The projection display system according to claim 1, wherein the light splitting device is further configured to split the second light into beams of two beams of light that are respectively emitted along the first optical path and the second optical path, the two beams of light having a same color.

6. The projection display system according to claim 1, wherein the light splitting device comprises a color selection polarizer and a polarization light-splitter, the color selection polarizer is configured to convert the first light into combined light of the first wavelength range light in a first polarization state and the second wavelength range light in a second polarization state, and the polarization light-splitter is configured to split the combined light into the first wavelength range light emitted along the first optical path and the second wavelength range light emitted along the second optical path.

7. The projection display system according to claim 1, wherein the image data of the first component is image data of a red component and/or of a green component, and the image data of the second component is image data of a blue component.

8. The projection display system according to claim 7, wherein when the image data of the first component is the image data of the red component or of the green component, the third light modulator cooperates with the first light modulator or the second modulator to synchronously modulate according to a gray value of red color or of green color.

9. The projection display system according to claim 7, wherein when the image data of the first component is the image data of the red component and of the green component, the third light modulator modulates according to image data of a color component having a larger gray value in the image data of the red color component and the image data of the green color component and cooperates with the first light modulator or the second light modulator to modulate, such that brightness of image data of the color component having the larger gray value coincides with the larger gray value.

10. The projection display system according to claim 9, wherein the first light modulator or the second light modulator modulates, according to a ratio of a gray value of the image data of the red color component to a gray value of the image data of the green color component, a light passing rate corresponding to the color component having a smaller gray value.

11. The projection display system according to claim 1, further comprising:
    a control device configured to control ON and OFF of the light emitting device, in such a manner that the light emitting device is in an OFF state when the light modulator is in a rising edge or a falling edge.

12. The projection display system according to claim 1, wherein an optical length of the first optical path is equal to an optical length of the second optical path.

13. The projection display system according to claim 1, wherein each of the first light modulator and the second light modulator is one of a transmissive liquid crystal light valve, a reflective liquid crystal light valve and a digital micromirror device, and the third light modulator is one of a transmissive liquid crystal light valve, a reflective liquid crystal light valve and a digital micromirror device.

14. The projection display system according to claim 13, wherein the first light modulator and the second light modulator are digital micromirror devices, and the first light modulator and the second light modulator are located in an optical path of a light emitted by the third light modulator.

15. The projection display system according to claim 1, wherein the light emitting device comprises a light emitting unit and a wavelength conversion device, the wavelength conversion device is driven by a driving device to periodically expose, in a time sequence, different regions of the wavelength conversion device in an optical path of light emitted from the light emitting unit, to generate, in the time sequence, the first light and the second light.

16. The projection display system according to claim 15, wherein the light emitting device further comprises a supplementary light source for emitting supplementary light, the supplementary light and the light emitted, in the time sequence, by the wavelength conversion device are combined, to emit, in the time sequence, the first light and the second light.

* * * * *